United States Patent
Seelbach et al.

(10) Patent No.: US 6,720,886 B2
(45) Date of Patent: Apr. 13, 2004

(54) SWITCHGEAR CABINET INCLUDING A SMOKE INDICATOR MEANS

(75) Inventors: Michael Seelbach, Freudenberg (DE); Heinrich Strackbein, Biebertal (DE); Markus Hain, Dillenburg (DE); Edgar Nickel, Angelburg-Frechenhausen (DE)

(73) Assignee: Rittal GmbH & Co. KG, Herborn (DE)

( * ) Notice: Subject to any disclaimer, the term of this patent is extended or adjusted under 35 U.S.C. 154(b) by 66 days.

(21) Appl. No.: 10/102,595

(22) Filed: Mar. 20, 2002

(65) Prior Publication Data

US 2003/0063007 A1 Apr. 3, 2003

(30) Foreign Application Priority Data

Mar. 22, 2001 (DE) .......................... 101 14 729

(51) Int. Cl.$^7$ ................................................ G08G 17/10
(52) U.S. Cl. ..................... 340/693.6; 340/600; 340/628
(58) Field of Search ............................. 340/628, 693.5, 340/693.6, 600

(56) References Cited

U.S. PATENT DOCUMENTS 4,177,461 A * 12/1979 Brown et al. ............... 340/628
5,260,691 A * 11/1993 Shyu ........................... 340/589
5,537,096 A * 7/1996 Wagner ..................... 340/693.6
6,317,053 B1 * 11/2001 Seeliger et al. .......... 340/693.5

FOREIGN PATENT DOCUMENTS

| DE | 196 05 638 C1 | 6/1997 |
| DE | 198 07 804 A1 | 9/1998 |
| DE | 198 07 804 | 9/1998 |
| DE | 197 10 019 C2 | 6/2000 |
| EP | 0 774 742 A3 | 12/1997 |
| EP | 030 279 A2 | 8/2000 |
| FR | 2 724 247 | 9/1996 |

* cited by examiner

Primary Examiner—Harold Joyce
(74) Attorney, Agent, or Firm—Pauley Petersen & Erickson

(57) ABSTRACT

A switchgear cabinet including a smoke indicator which has an intake pipe and, in a housing, a smoke sensor as well as a fan or ventilator, which draws air from the interior of the switchgear cabinet into the housing via an inlet aperture in a housing wall and discharges the air via an outlet into the space outside the housing. A sensitive smoke indicator, which is also usable with the switchgear cabinet partially open, has the intake pipe communicating by its upper end region with the inlet aperture. The housing which is enclosed in a sealing manner apart from the intake pipe and the outlet, is disposed in the interior of the switchgear cabinet.

18 Claims, 1 Drawing Sheet

SWITCHGEAR CABINET INCLUDING A SMOKE INDICATOR MEANS

BACKGROUND OF THE INVENTION

1. Field of the Invention

This invention relates to a switchgear cabinet including a smoke indicator, which has an intake pipe and, in a housing, a smoke sensor as well as a ventilator or fan, which is disposed downstream of the sensor in the flow path and draws air from an interior of the switchgear cabinet into the housing via an inlet aperture in a housing wall and discharges it via an outlet into the space outside the housing.

2. Description of Related Art

A switchgear cabinet is taught by German Patent Reference DE 198 07 804 A1. In this known switchgear cabinet, which has a closed-off interior, there is an early fire detector including a ventilator of fan, which is disposed externally of the actual switchgear cabinet in an additional cabinet placed on the switchgear cabinet, and early fire detecting sensors, which are disposed in front and relatively close. A supply pipe with a plurality of bores distributed over the length is disposed in the interior of the switchgear cabinet. The supply pipe is connected to a connecting piece protruding from the switchgear cabinet, via which fresh air flows into the interior of the switchgear cabinet when the ventilator is operating. The air passing into the interior flows through this and at the upper side of the switchgear cabinet, is drawn through an aperture located there by the ventilator, which is situated in the additional cabinet. The air drawn out of the entire interior, which air is mixed with the fresh air, flows over the early fire detecting sensors so that a fire is recognized by the sensors.

SUMMARY OF THE INVENTION

One object of this invention is to provide a switchgear cabinet of the type mentioned above but where smoke generated as heat develops and can be recognized as early as possible and which responds in a sufficiently sensitive manner even if the switchgear cabinet is partially open.

This object is achieved with the characteristics of an invention as described in the claims and this specification. An intake pipe communicates by its upper end region with the inlet aperture and the housing, which is enclosed in a sealing manner apart from the intake opening and the outlet, and is disposed in the interior of the switchgear cabinet.

Thus, the air to be monitored in the interior of the switchgear cabinet is supplied to the smoke sensor in a targeted manner corresponding to the arrangement and configuration of the inlet apertures of the intake pipe, in such a manner that the smoke sensor responds sensitively to a development of smoke. The smoke indicator is easily installed or respectively fitted as an individual unit in the interior of the switchgear cabinet. The intake pipe can be provided in the interior in a convenient manner, for example with consideration to existing components, with various inlet apertures and, can be assembled, for example, piece-by-piece through plug-in connections.

In an arrangement, which is favorable to the functioning, the housing is disposed in the upper region in the interior of the switchgear cabinet at a spacing from a switchgear cabinet covering wall.

For advantageous, space-saving arrangement possibilities, the housing is mounted on a side wall or door of the switchgear cabinet.

In an advantageous design of the smoke indicator, particularly for production, for assembly and function the intake pipe communicates with a lower housing wall, the ventilator is mounted on an upper housing wall in the region of the outlet, and the smoke sensor is mounted on a base plate of the housing, which base plate connects the lower housing wall and the upper housing wall.

Simultaneously, in a development favorable to the manufacture, installation and maintenance, the lower housing wall and the upper housing wall are formed by portions, bent at right angles to the base plate. A lower housing portion, thus formed for formation of the rectangular housing is closed off with an upper housing portion, which has a U-shaped cross-section. On the covering wall of the upper housing portion, which wall is situated opposite the base plate, both lateral walls are formed by portions which are bent at right angles, and which project up to into the vicinity of the base plate and are detachably connected to the base plate via lateral mounting webs or mounting straps.

If the intake pipe, which is open or closed at its end remote from the intake opening, has air inlet apertures over its length, the interior of the switchgear cabinet can be monitored substantially over its entire height in an even manner or through the corresponding selection of hole distribution per unit length or hole size of the air inlet apertures. For example, certain components are to be especially monitored, weighted with regard to the creation of smoke.

In one design, at least the one door and/or at least one side wall and/or the rear wall of the switchgear cabinet has narrow openings distributed over at least a portion of its surface. The air inlet apertures are disposed on the side of the intake pipe remote from the adjacent door, rear wall or side wall, which provides relatively reliable smoke monitoring of the interior of the switchgear cabinet even in the case of, for example, a switchgear cabinet having a hole pattern or slot pattern in the door or exterior wall.

In a simple, unhindered installation, the housing is mounted on the door.

In a further advantageous embodiment of the smoke indicator with regard to the signal evaluation and control and consequently the function, electrical connecting members for the ventilator and the smoke sensor are disposed in the housing. The smoke sensor and/or the ventilator is connected to a superposed switchgear cabinet monitoring means, which is disposed externally of the housing, with which monitoring means supplied sensor signals and/or ventilator monitoring signals and/or ventilator control signals are receivable, processable or transmittable. Thus, in one embodiment, the smoke indicator is configured so that the smoke sensor, when detecting smoke, switches off the ventilator by a switching-off arrangement provided in the housing. The switching off of the ventilator is determined by the switchgear cabinet monitoring means and data is transmittable to a display device. A separate connection for passing on the sensor signals to the switchgear cabinet monitoring means is superfluous here. The speed monitoring of the ventilator and/or monitoring signal from the switching device can be used, for example, for monitoring the smoke sensor.

BRIEF DESCRIPTION OF THE DRAWINGS

This invention is described in more detail in view of an embodiment with reference to the drawings, wherein.

DESCRIPTION OF PREFERRED EMBODIMENTS

Figure 1:
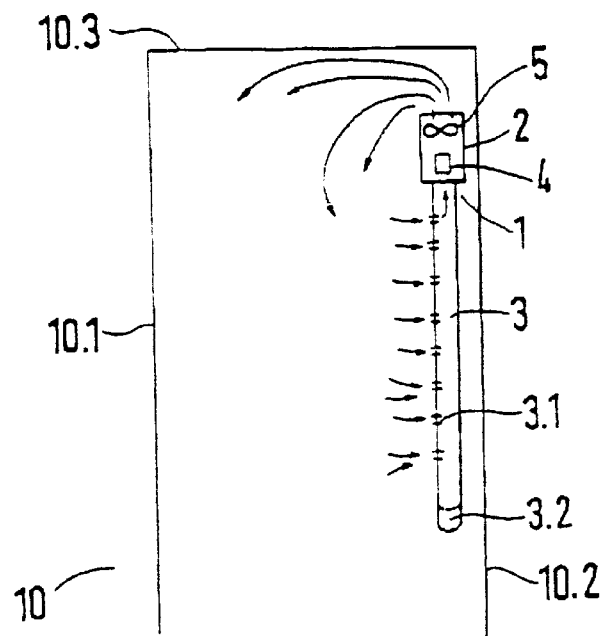
FIG. 1 is a schematic, lateral view of a switchgear cabinet having a smoke indicator means disposed therein.
Figure 2:
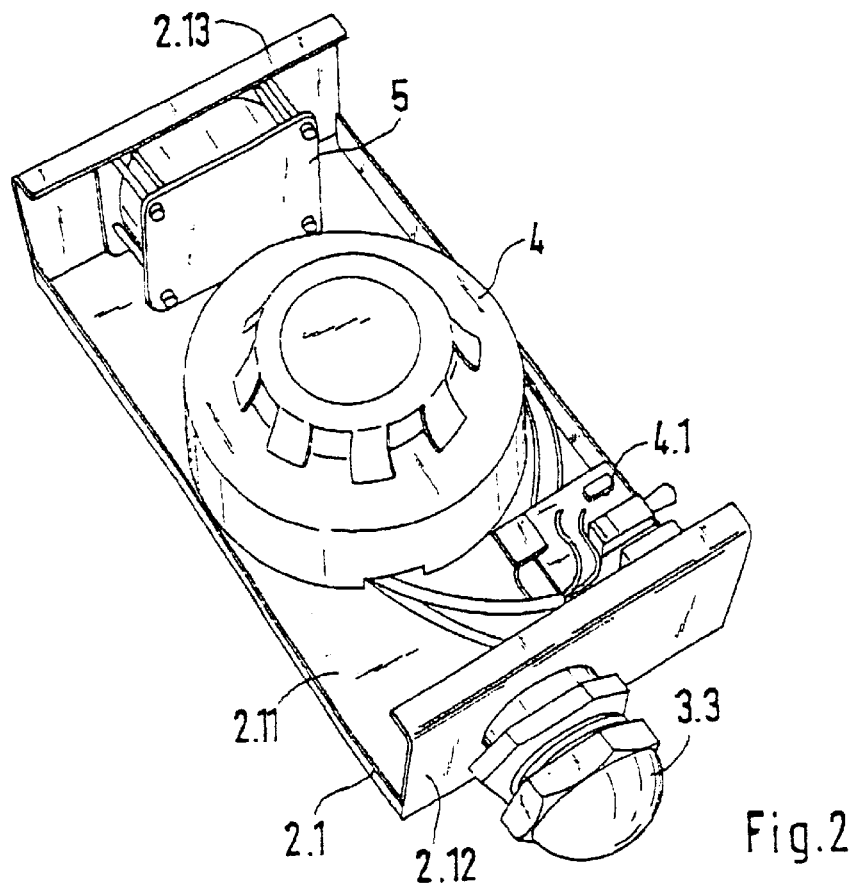
FIG. 2 is a perspective view of an open housing of the smoke indicator means.

As shown in FIG. 1, in a switchgear cabinet 10, which has a front door 10.1, a rear door 10.2 or rear wall, two lateral walls and one switchgear cabinet covering wall 10.3, in the vicinity of, for example, the rear door 10.2, there is a smoke indicator 1 with a housing 2, which is in the upper region of the switchgear cabinet 10 and at a spacing from the switchgear cabinet covering wall, and an intake pipe 3, which is mounted underneath on a lower housing wall 2.12 of the housing 2, as shown in FIG. 2.

FIG. 2 shows a lower housing portion 2.1 of the housing 2 with a base plate 2.11, the lower housing wall 2.12, and an upper housing wall 2.13, which are bent at right angles from the base plate. On their upper edges, in their turn, are flange-type edges which are bent inwardly at right angles. To the side, the lower housing portion 2.1 has low, web-like portions, which are bent inwardly at right angles, in which portions threaded bores or bores having screwed nuts are provided for the mounting of an upper housing portion, not shown. The suitably designed housing upper portion has a U-shaped cross-section and lateral walls formed by portions which are bent at right angles and which form U-members. When the housing upper part is placed in a position, a covering wall, which is situated opposite the base plate 2.11, rests on the flange-type, angled portions of the lower housing wall and the upper housing wall 2.12, 2.13. The lateral walls project with their free ends into the region of the base plate 2.11 and can be detachably connected to the webs angled thereon by screws.

A smoke sensor 4 is mounted substantially centrally in the rectangular housing 2 on the base plate 2.11 of the lower housing portion 2.1. The smoke sensor 4 is connected to electrical connecting members 4.1, which are also mounted on the base plate 2.11 and which also include a reset switch which projects laterally from the housing 2 with a tactile part. A ventilator or fan 5 with its house-like support is mounted by screws on the inner surface of the upper housing wall 2.13, in the region of an outlet, therein disposed. On the lower housing wall 2.12 there is an inlet aperture, to which the intake pipe 3 is connected in a sealing manner by a screw connection, for example as found in electrical installation technology used for connecting cable pipes. The housing 2 is only slightly wider than the smoke sensor 4 and is closed in a sealing manner apart from the intake opening and the outlet. It is also possible to dispose a cable passage and/or, for example, a reset key in a housing wall.

The intake pipe 3, which is shown in FIG. 1, projects at right angles into the lower region of the switchgear cabinet 10, has air inlet apertures 3.1, which are distributed over its length on its side remote from the adjacent rear door 10.2, which for example is produced from a perforated sheet or has corresponding holes or slots in substantial surface areas, and communicates at its lower end with a locking member 3.2. The intake pipe 3 can be configured for piece by piece assembly, for example, by plug in connections or so as to be connectable by plug in connections, and can have junction pieces or curved pieces so that it can be suitably disposed in the interior of the switchgear cabinet 10 and can be laid in dependence on components provided therein. The intake pipe 3 is, for example, a plastics material pipe, such as is known in electrical installation technology for cable laying. It can also be configured in a resilient manner as a hose.

When the smoke indicator 1 is operating, air is sucked or drawn by the ventilator 5 from the interior of the switchgear cabinet through the air inlet apertures 3.1 into the intake pipe 3. From there the smoke flows through the inlet aperture in the lower housing wall 2.12 of the housing 2 into the rectangular housing 2, which is substantially closed in a sealing manner. The smoke flows by way of the smoke sensor 4 as well as the ventilator 5 and the outlet, which is provided in the upper housing wall 2.13, on the upper side of the housing 2, back into the switchgear cabinet, as shown by the arrow in FIG. 1. Should smoke be generated in the interior of the switchgear cabinet, it is supplied, along with the air, to the smoke sensor 4, which responds when a predetermined or predeterminable threshold is exceeded and transmits corresponding sensor signals.

The sensor signals can be transmitted directly via a corresponding data line to a switchgear cabinet monitoring means, which is disposed in the switchgear cabinet 10 or is remote therefrom and also fulfills other monitoring and control tasks, and can be processed by this switchgear cabinet monitoring means. However, in addition or on its own, the ventilator 5 can be switched off by the sensor signals. The ventilator in its turn is in communication with the switchgear cabinet monitoring means for monitoring and/or control. If the smoke sensor 4 is not directly connected to the switchgear cabinet monitoring means, the responding of the smoke sensor 4 can be inferred from the ventilator monitoring signal, which for example is provided from a speed sensor, it being possible to determine the responding of the smoke sensor 4, for example, from the evaluation of the control signals of the ventilator 5. The switching device, which is actuated by the sensor signal of the smoke sensor 4 and effects the switching-off, can also, for example, be monitored by the switchgear cabinet monitoring means to infer a smoke message from the smoke sensor 4. Where the ventilator monitoring signal or respectively switching signal is used for determining the responding of the smoke sensor 4, a separate connection between the smoke sensor 4 and the superposed switchgear cabinet monitoring means can be saved.

German Patent Reference 101 14 729.5-32, the priority document corresponding to this invention, and its teachings are incorporated, by reference, into this specification.

We claim:

1. In a switchgear cabinet (10) including a smoke indicator (1) having an intake pipe (3) and in a housing (2) a smoke sensor (4) and a fan or ventilator (5), which is disposed downstream of the smoke sensor in a flow path and draws air from an interior of the switchgear cabinet (10) into the housing (2) via an inlet aperture in a lower housing wall (2.12) and discharges the air via an outlet into the space outside the housing (2), the improvement comprising:

the intake pipe (3) communicating by an upper end region with the inlet aperture, and the housing (2) enclosed in a sealing manner apart from the inlet aperture and the outlet disposed in the interior of the switchgear cabinet (10);

the housing (2) disposed in an upper region of the interior of the switchgear cabinet (10) at a spacing from a switchgear cabinet covering wall (10.3); the intake pipe (3) connected with the lower housing wall (2.12) and extending therefrom, the intake pipe (3) having air inlet apertures (3.1) over a length of the intake pipe (3).

2. In the switchgear cabinet according to claim 1, wherein the housing (2) is disposed in an upper region of the interior of the switchgear cabinet (10) at a spacing from a switchgear cabinet covering wall (10.3).

3. In the switchgear cabinet according to claim 1, wherein the housing (2) is mounted on one of a side wall and a door (10.1, 10.2) of the switchgear cabinet (10).

4. In the switchgear cabinet according to claim 3, wherein the intake pipe (3) communicates with the lower housing wall (2.12), the ventilator (5) is mounted on an upper housing wall (2.13) near the outlet, the smoke sensor (4) is mounted on a base plate (2.11) of the housing (2), and the base plate (2.11) connects the lower housing wall (2.12) and the upper housing wall (2.13).

5. In the switchgear cabinet according to claim 4, wherein the lower housing wall (2.12) and the upper housing wall (2.13) are formed by portions bent at right angles to the base plate (2.11), a lower housing portion (2.1) for the formation of the rectangular housing (2) is closed off with an upper housing portion, which has a U-shaped cross-section on the covering wall of which an upper housing portion, the covering wall is situated opposite the base plate (2.11), both lateral walls are formed by portions which are bent at right angles that project up to the base plate (2.11) and are detachably connected to the base plate (2.11) by way of one of lateral mounting webs and mounting straps.

6. In the switchgear cabinet according to claim 5, wherein the intake pipe (3) is open or closed at its end remote from the inlet aperture.

7. In the switchgear cabinet according to claim 6, wherein at least one of the door (10.1, 10.2) and at least one side wall and the rear wall of the switchgear cabinet (10) has narrow openings distributed over at least a portion of a surface and the air inlet apertures (3.1) are disposed on a side of the intake pipe (3) remote from one of the adjacent door (10.1, 10.2), the rear wall and the side wall.

8. In the switchgear cabinet according to claim 7, wherein the housing (2) is attached to the door (10.1, 10.2).

9. In the switchgear cabinet according to claim 8, wherein electrical connecting members (4.1) for the ventilator (5) and the smoke sensor (4) are disposed in the housing (2) and at least one of the smoke sensor (4) and the ventilator (5) is connected to a superposed switchgear cabinet monitoring means disposed externally of the housing (2), and with the monitoring means at least one of supplied sensor signals, ventilator monitoring signals, and ventilator control signals are one of receivable, processable and transmittable.

10. In the switchgear cabinet according to claim 9, wherein the smoke indicator (1) is configured so that the smoke sensor (4), when detecting smoke, switches-off the ventilator (5) by a switching arrangement provided in the housing (2) and the switching off of the ventilator (5) is determined by the switchgear cabinet monitoring means and data is transmittable to a display device.

11. In the switchgear cabinet according to claim 1, wherein the housing (2) is mounted on one of a side wall and a door (10.1, 10.2) of the switchgear cabinet (10).

12. In the switchgear cabinet according to claim 1, wherein the intake pipe (3) communicates with the lower housing wall (2.12), the ventilator (5) is mounted on an upper housing wall (2.13) near the outlet, the smoke sensor (4) is mounted on a base plate (2.11) of the housing (2), and the base plate (2.11) connects the lower housing wall (2.12) and the upper housing wall (2.13).

13. In the switchgear cabinet according to claim 12, wherein the lower housing wall (2.12) and the upper housing wall (2.13) are formed by portions bent at right angles to the base plate (2.11), a lower housing portion (2.1) for the formation of the rectangular housing (2) is closed off with an upper housing portion, which has a U-shaped cross-section on the covering wall of which an upper housing portion, the covering wall is situated opposite the base plate (2.11), both lateral walls are formed by portions which are bent at right angles that project up to the base plate (2.11) and are detachably connected to the base plate (2.11) by way of one of lateral mounting webs and mounting straps.

14. In the switchgear cabinet according to claim 1, wherein the intake pipe (3) is open or closed at its end remote from the inlet aperture.

15. In the switchgear cabinet according to claim 14, wherein at least one of the door (10.1, 10.2) and at least one side wall and the rear wall of the switchgear cabinet (10) has narrow openings distributed over at least a portion of a surface and the air inlet apertures (3.1) are disposed on a side of the intake pipe (3) remote from one of an adjacent door (10.1, 10.2), a rear wall and a side wall.

16. In the switchgear cabinet according to claim 1, wherein the housing (2) is attached to a door (10.1, 10.2).

17. In the switchgear cabinet according to claim 1, wherein electrical connecting members (4.1) for the ventilator (5) and the smoke sensor (4) are disposed in the housing (2) and at least one of the smoke sensor (4) and the ventilator (5) is connected to a superposed switchgear cabinet monitoring means disposed externally of the housing (2), and with the monitoring means at least one of supplied sensor signals, ventilator monitoring signals, and ventilator control signals are one of receivable, processable and transmittable.

18. In the switchgear cabinet according to claim 17, wherein the smoke indicator (1) is configured so that the smoke sensor (4), when detecting smoke, switches-off the ventilator (5) by a switching arrangement provided in the housing (2) and the switching off of the ventilator (5) is determined by the switchgear cabinet monitoring means and data is transmittable to a display device.

* * * * *